United States Patent
Saby et al.

(10) Patent No.: US 11,190,056 B2
(45) Date of Patent: Nov. 30, 2021

(54) METHOD AND SYSTEM FOR TRANSMITTING THE POWER OF A RADIO FREQUENCY TYPE SIGNAL RECEIVED BY A RADIO FREQUENCY RECEIVER

(71) Applicant: EM MICROELECTRONIC-MARIN S.A., Marin (CH)

(72) Inventors: Jerome Saby, Colombier (CH); Maeve Petit, Toulon (FR); Thomas Coulot, Vercel-Villedieu-le-Camp (FR)

(73) Assignee: EM MICROELECTRONIC-MARIN S.A., Marin (CH)

( * ) Notice: Subject to any disclaimer, the term of this patent is extended or adjusted under 35 U.S.C. 154(b) by 0 days.

(21) Appl. No.: 16/835,945

(22) Filed: Mar. 31, 2020

(65) Prior Publication Data
US 2020/0336014 A1    Oct. 22, 2020

(30) Foreign Application Priority Data
Apr. 17, 2019  (EP) .................................... 19169925

(51) Int. Cl.
| H04B 1/16 | (2006.01) |
| H02J 50/20 | (2016.01) |
| H02J 50/80 | (2016.01) |

(52) U.S. Cl.
CPC .............. *H02J 50/20* (2016.02); *H02J 50/80* (2016.02); *H04B 1/16* (2013.01)

(58) Field of Classification Search
CPC .. H02J 50/12; H02J 50/80; H02J 50/40; H02J 50/20; H04B 5/0037; H04B 5/0075; H04B 1/16

USPC ................. 375/219, 238, 256–259, 312, 316
See application file for complete search history.

(56) References Cited

U.S. PATENT DOCUMENTS

| 5,754,419 A * | 5/1998 | Ho ........................ H02M 3/158 363/89 |
| 2006/0082381 A1* | 4/2006 | Takamuku ............... H03K 5/06 326/15 |
| 2007/0152601 A1* | 7/2007 | Nerone .............. H05B 41/2886 315/209 R |
| 2010/0277003 A1* | 11/2010 | Von Novak .......... H04B 5/0037 307/104 |
| 2011/0127843 A1 | 6/2011 | Karaoguz et al. |

(Continued)

OTHER PUBLICATIONS

European Search Report for EP 19 16 9925 dated Sep. 27, 2019.

*Primary Examiner* — Emmanuel Bayard
(74) *Attorney, Agent, or Firm* — Sughrue Mion, PLLC

(57) ABSTRACT

A method and device for transmitting (20) to an electrical element (4) the power of a radio frequency type signal received by a radio frequency receiver (1), e.g., a radio frequency identification (RFID) chip, the receiver (1) having a receiving antenna (2) and a voltage rectifier (3) of the signal received by the antenna (2), the transmission device (20) including a voltage converter (30) connected to the rectifier (3) of the chip and to the electrical element (4). The device includes a control system (40) configured to momentarily derive the signal from the rectifier (3) in order to define an optimal input voltage of the converter (30) for which the input impedance of the converter corresponds to the output impedance of the rectifier (2), and to redirect the DC signal to the voltage converter (30) by providing the converter with an input voltage setpoint corresponding to the optimal voltage.

14 Claims, 3 Drawing Sheets

(56) References Cited

U.S. PATENT DOCUMENTS

| | | | |
|---|---|---|---|
| 2012/0293009 A1* | 11/2012 | Kim | B60L 53/126 |
| | | | 307/104 |
| 2012/0306284 A1* | 12/2012 | Lee | H04B 5/0037 |
| | | | 307/104 |
| 2013/0310630 A1* | 11/2013 | Smith | A61M 60/50 |
| | | | 600/16 |
| 2014/0145675 A1* | 5/2014 | Shimizu | H04B 5/0075 |
| | | | 320/108 |
| 2014/0339908 A1* | 11/2014 | Omae | H02J 50/60 |
| | | | 307/104 |
| 2015/0008755 A1* | 1/2015 | Sone | H02J 7/025 |
| | | | 307/104 |
| 2015/0022017 A1 | 1/2015 | Kim et al. | |
| 2015/0207333 A1* | 7/2015 | Baarman | H02J 50/12 |
| | | | 307/104 |
| 2016/0036243 A1 | 2/2016 | Hayashi et al. | |
| 2016/0241145 A1* | 8/2016 | Matsuura | H02M 3/156 |
| 2016/0254679 A1* | 9/2016 | Liu | H02J 50/12 |
| | | | 307/104 |
| 2016/0377670 A1* | 12/2016 | Tamida | G01R 31/50 |
| | | | 324/551 |
| 2019/0180157 A1* | 6/2019 | Yase | G06K 19/0723 |
| 2019/0181682 A1* | 6/2019 | Kim | H02J 50/10 |
| 2019/0379230 A1* | 12/2019 | Wu | H02J 7/06 |
| 2020/0119591 A1* | 4/2020 | Arnitz | H02J 7/0063 |

\* cited by examiner

Art antérieur

METHOD AND SYSTEM FOR TRANSMITTING THE POWER OF A RADIO FREQUENCY TYPE SIGNAL RECEIVED BY A RADIO FREQUENCY RECEIVER

CROSS-REFERENCE TO RELATED APPLICATION

This application claims priority to European Patent Application No. 19169925.5, filed on Apr. 17, 2019, the entire contents of which are incorporated herein by reference.

FIELD OF THE INVENTION

The invention relates to a method for transmitting to an electrical element the power of a radio frequency type signal received by a radio frequency receiver, for example a radio frequency identification chip.

The invention also relates to a system for transmitting to an electrical element the power of a radio frequency type signal received by a radio frequency receiver, for example a radio frequency identification chip.

The invention also relates to an electronic assembly comprising a transmission system according to the invention.

BACKGROUND OF THE INVENTION

In the field of radio frequency waves, it is useful to be able to capture the energy carried by the waves to use it and operate an electrical element. For example, passive radio frequency identification (RFID) type chips, generally used to react to electromagnetic stimuli, are known. Such a chip comprises a receiving antenna for capturing a signal emitted remotely by an emitter. This signal supplies energy to the chip to allow it to execute a task, for example to carry out a measurement or simply to transmit a signal comprising information in response to the received signal. A known application relates in particular to the detection of theft of products in stores.

FIG. 1 shows a radio frequency identification (RFID) type chip 1 known from the state of the art, on which an electrical element 4 is connected, for example an energy storage battery received by the antenna 2. The antenna is represented as an alternative generator 5, as well as a coil 6 and a resistance 7 in series on the branch 8 of the phase of the generator 5. The electrical element 4 connects the branch of the phase 8 to the branch 9 linked to the neutral and to the ground of the antenna.

To supply energy to the electrical element 4, the chip 1 comprises a voltage rectifier 3 to convert the signal received by the antenna 2 in alternating voltage into a DC voltage, so as to be usable by the electrical element 4. The rectifier 3 comprises a first diode 11 disposed directly on the branch of the phase 8, while a second diode 12 is disposed in reverse on the neutral branch 9 of the circuit. The rectifier 3 also includes a third diode 13 disposed directly and in parallel between the neutral branch 9 upstream of the second diode 12 and the branch of the phase 8 downstream of the first diode 11. The rectifier 3 is also provided with a fourth diode 14 disposed in reverse and in parallel between the branch of the phase 8 upstream of the first diode 11 and the neutral branch 9 downstream of the second diode 12.

Depending on the applications, more or less energy may be required to supply the electrical element of the chip. The chips are for example associated with a battery as an electrical element to store energy and be able to execute the task for a certain time. The configuration of the antenna, such as its dimensions, have an impact on its ability to transmit energy to the load. Indeed, the impedance of the antenna depends on its shape and structure. Generally, the antenna and the electrical element are associated, so that their impedances correspond to transmit the maximum energy received by the antenna to the electrical element.

However, the signal received by the antenna can vary, for example if the emitter is moving relative to the chip, or vice versa. Generally, the chip is configured to be able to transmit energy to the electrical element when the signal received by the antenna is weak. Thus, the chip can operate with a weak signal. However, when the power of the received signal is higher, the configuration of the chip prevents a total transmission of energy to the circuit. Energy losses are significant, because the input impedance of the circuit no longer corresponds to that of the antenna which varies with the power of the signal.

To maximise the transmission of energy received by the antenna, it is necessary to modify the input impedance of the electrical element to adapt it to that of the antenna. There are several methods for performing such a modification. Particularly, a perturbation and observation method of the P&O type is known, which consists in measuring the signal power at the output of the antenna, in order to modify the input impedance of the circuit to adapt it to the power received by the antenna. However, this method requires a lot of energy, which is not compatible with a use of chips where the received energy must be able to be used to the maximum for its tasks.

SUMMARY OF THE INVENTION

Therefore, the invention has the purpose of overcoming the disadvantages of the aforementioned state of the art by proposing a method for transmitting the power received by an antenna of a radio frequency receiver, for example a radio frequency identification (RFID) type chip, the method allowing to optimally transmit the signal power to an electrical element, regardless of the power received.

To this end, the invention relates to a method for transmitting to an electrical element the power of a radio frequency type signal received by a radio frequency receiver, for example a radio frequency identification (RFID) type chip, the receiver being provided with a receiving antenna and a voltage rectifier, the method being implemented by a transmission device comprising a control system and a voltage converter, The method is remarkable in that it comprises the following steps consisting in:
  momentarily deriving the signal from the rectifier to the control system to define an optimal input voltage of the converter for which the input impedance of the converter corresponds to the output impedance of the rectifier,
  redirecting the DC signal to the voltage converter,
  providing, preferably simultaneously, the converter with an input voltage setpoint corresponding to the optimal voltage,
  converting the signal voltage thanks to the voltage converter, the output voltage of the converter being predefined depending on the electrical element,
  transmitting the signal converted by the converter to the electrical element.

Thus, by deriving the signal, the control system can determine an optimal voltage without the need to directly measure the power of the signal. Thanks to this method, it is easy to adapt the input impedance of the electrical element by means of the converter to transmit the maximum power carried by the signal to the electrical element. A significant loss of energy is avoided each time it is wished to adapt the input impedance of the circuit. In this way, an efficient method for constantly transmitting the maximum power of the signal received by the radio frequency receiver to the electrical element, regardless of its value, is obtained.

Furthermore, the method requires space-saving components, which is well adapted to small receivers, such as radio frequency identification chips, generally of small size.

According to a particular embodiment of the invention, the steps are periodically repeated in this order to constantly adapt the input impedance of the converter so as to transmit the maximum energy of the received signal.

According to a particular embodiment of the invention, the optimal voltage is stored in a first condenser after having been defined.

According to a particular embodiment of the invention, there will be carried out alternately the derivation step for a first period T1 and the subsequent steps for a second period T2.

According to a particular embodiment of the invention, the method comprises a step of comparing the input voltage of the converter to the voltage setpoint defined by the system for controlling and modifying a variable resistance of the converter to modify the input voltage of the converter according to the setpoint voltage.

The invention also relates to a device for transmitting to an electrical element the power of a signal of the radio frequency type received by a radio frequency receiver, for example a radio frequency identification (RFID) type chip, the receiver being provided with a receiving antenna and a voltage rectifier of the signal received by the antenna, the transmission device comprising a voltage converter connected to the rectifier of the chip and to the electrical element. The device is remarkable in that it comprises a control system configured to momentarily derive the signal from the rectifier in order to define an optimal input voltage of the converter for which the input impedance of the converter corresponds to the output impedance of the rectifier, and to redirect the DC signal to the voltage converter by providing the converter with an input voltage setpoint corresponding to the optimal voltage.

According to a particular embodiment of the invention, the control system comprises a reference resistance arranged between the phase input of the converter and the neutral branch, the setpoint voltage being defined at the terminals of the reference resistance.

According to a particular embodiment of the invention, the control system comprises a first condenser connected in parallel and downstream of the reference resistance to store the reference voltage.

According to a particular embodiment of the invention, the control system comprises a buffer amplifier at the output of the phase branch.

According to a particular embodiment of the invention, the control system comprises a second condenser connected in parallel with the reference resistance.

According to a particular embodiment of the invention, the control system comprises a first switch between the first condenser and the reference resistance.

According to a particular embodiment of the invention, the control system comprises a second switch between the first condenser and the reference resistance.

According to a particular embodiment of the invention, the control system comprises a second switch between the reference resistance and the neutral branch.

According to a particular embodiment of the invention, the control system comprises a third switch between the second condenser and the neutral branch.

According to a particular embodiment of the invention, the control system comprises means for controlling the switches.

According to a particular embodiment of the invention, the converter comprises an operational amplifier connected at the input, on the one hand to the input of the voltage converter, and on the other hand to the control system to compare the input voltage of the converter to the voltage setpoint defined by the control system.

According to a particular embodiment of the invention, the converter comprises a variable resistance connected in series to the output of the operational amplifier.

The invention also relates to an electronic assembly comprising an electrical element and a radio frequency receiver, for example a radio frequency identification (RFID) type chip, the receiver being provided with a receiving antenna and a voltage rectifier of the signal received by the antenna.

The assembly is remarkable in that it comprises a transmission device as described above.

BRIEF DESCRIPTION OF THE DRAWINGS

The purposes, advantages and features of the method and of the system according to the invention will appear better in the following description of at least one non-limiting embodiment illustrated by the drawings wherein.

In the following description, the same numbers are used to designate identical or similar elements.

DETAILED DESCRIPTION OF THE INVENTION

Figure 2:
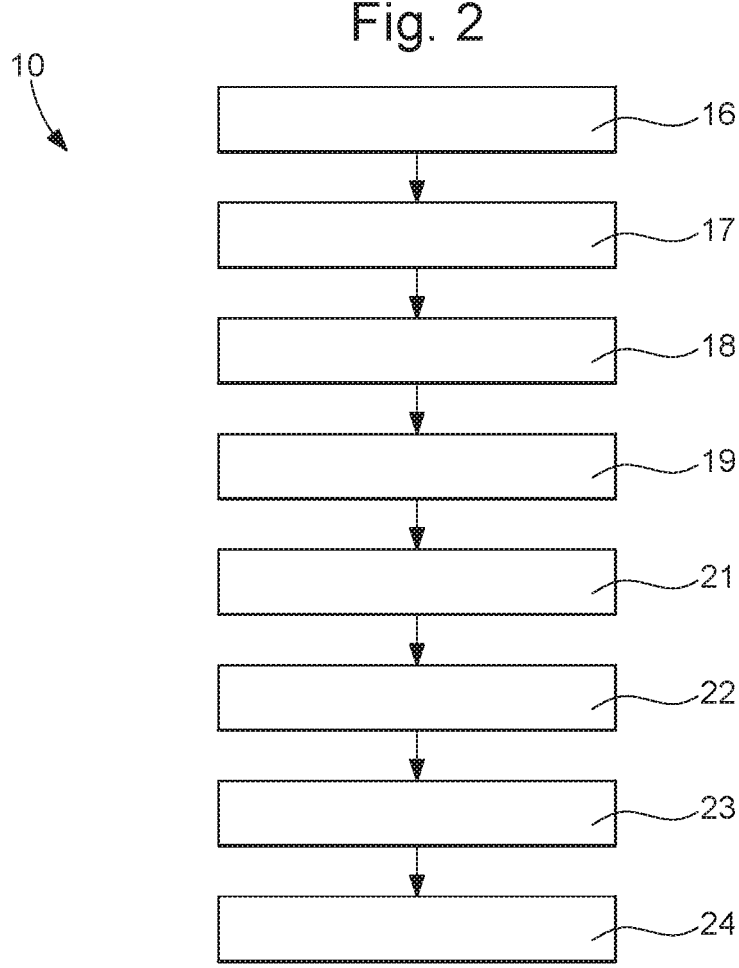
FIG. 2 is a block diagram of a method for transmitting the power of a signal received by a radio frequency identification (RFID) type chip.

FIG. 2 shows a method 10 for transmitting to an electrical element the power of a signal received by a radio frequency identification (RFID) type chip provided with a receiving antenna and with a voltage rectifier to transform the alternating signal into a DC signal. The method 10 is implemented by a transmission device comprising a control system and a voltage converter described later in the description.

The method 10 is intended to transmit the maximum power of the signal received by the antenna of a radio frequency identification (RFID) type chip to an electrical element, regardless of the variation in the power of the signal. The method 10 allows adapting the transmission capacity of the chip to the electrical element to the power of the signal.

The method comprises a first derivation step 16 consisting in momentarily deriving the signal from the converter to the control system to define an optimal input voltage of the converter for which the input impedance of the converter corresponds to the output impedance of the rectifier.

In a second step 17, the optimum voltage is obtained by connecting the signal from the rectifier to a reference resistance, the voltage at the terminals of which defines the optimal voltage. The value of the reference resistance is selected according to the identification chip, particularly the antenna and the converter. Indeed, the output impedance of the chip is defined by the shape and structure of the antenna, as well as by the converter. The value of the reference resistance corresponds to the output impedance of the chip.

The third step 18 consists in momentarily storing the optimal voltage after having been defined, for example in a condenser. Thus, the optimal voltage is stored so that it can be transmitted in a subsequent step.

In a fourth step 19, the DC signal from the rectifier is redirected to the voltage converter. Thus, the signal passes directly from the rectifier to the converter, and is no longer connected to the terminals of the reference resistance.

The fifth setpoint step 21 consists in providing, preferably simultaneously, the converter with an input voltage setpoint corresponding to the optimal voltage so that the maximum power is transmitted to the converter. The stored setpoint voltage is transmitted to the converter at the same time as the signal from the fourth step. In the example of the condenser, it discharges to transmit the setpoint voltage.

In a sixth comparison step 22, the current input voltage of the converter is compared with the voltage setpoint defined by the control system. Thus, one can know whether the current input voltage is correctly adjusted to maximise the energy transmission, or whether it should be modified to improve the transmission of the signal power. In case the current voltage does not correspond to the setpoint voltage, a variable resistance of the converter is modified to modify the input voltage of the converter. Thus, by modifying the value of the variable resistance, the input voltage is made to correspond to the setpoint voltage.

The method comprises a seventh step 23 of converting the signal voltage thanks to the voltage converter, the output voltage of the converter being predefined depending on the electrical element.

Finally, the eighth step 24 consists in transmitting the signal converted by the converter to the electrical element. The output voltage of the converter is predefined according to the electrical element. For example, if the electrical element is a battery, the output voltage is selected to allow the battery to charge the maximum energy transmitted by the signal.

Thanks to this method, the electrical element continuously receives the maximum possible power of the signal received by the antenna of the radio frequency identification chip. Particularly, when the power of the signal varies, the method allows adapting the converter for an optimal transmission of the power of the signal.

Preferably, the steps 16, 17, 18, 19, 21, 22, 23, 24 are repeated regularly in this order at a predetermined frequency in order to constantly adapt the input impedance of the converter to the signal power. Thus, the signal is periodically derived to determine each time a new input setpoint. The input voltage of the converter is therefore constantly adapted to the power of the signal received by the radio frequency identification chip.

For example, there are alternated the signal derivation to determine the setpoint voltage for a time $T1$, and the signal transmission to the electrical element for a time $T2$. The added period of the two times is defined by the following equation: $T=T1+T2$, where T is the total period of a cycle of the method 10. The first, second and third steps are carried out during time $T1$, while the fourth, fifth, sixth, seventh and eighth steps are carried out during time $T2$.

The invention also relates to a device 20 for transmitting to an electrical element 4 the power of a signal received by a radio frequency identification (RFID) type chip 1 and an electronic assembly 50 comprising such a transmission device 20 and said radio frequency identification chip 1. The transmission device 20 is in particular configured to implement the transmission method 10 described above.

Figure 3:
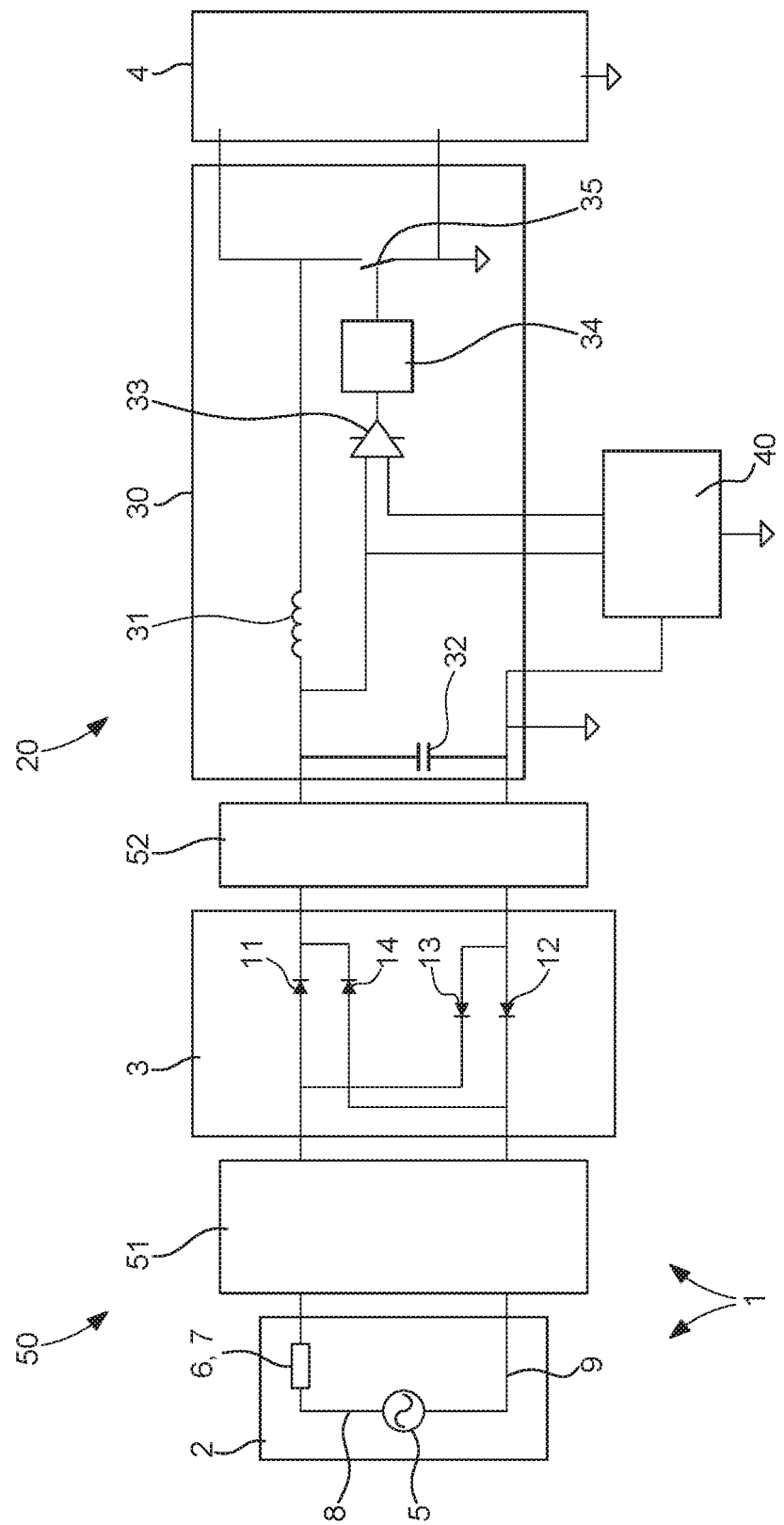
FIG. 3 shows an electronic assembly comprising a radio frequency identification chip and a transmission device according to the invention.
Figure 4:
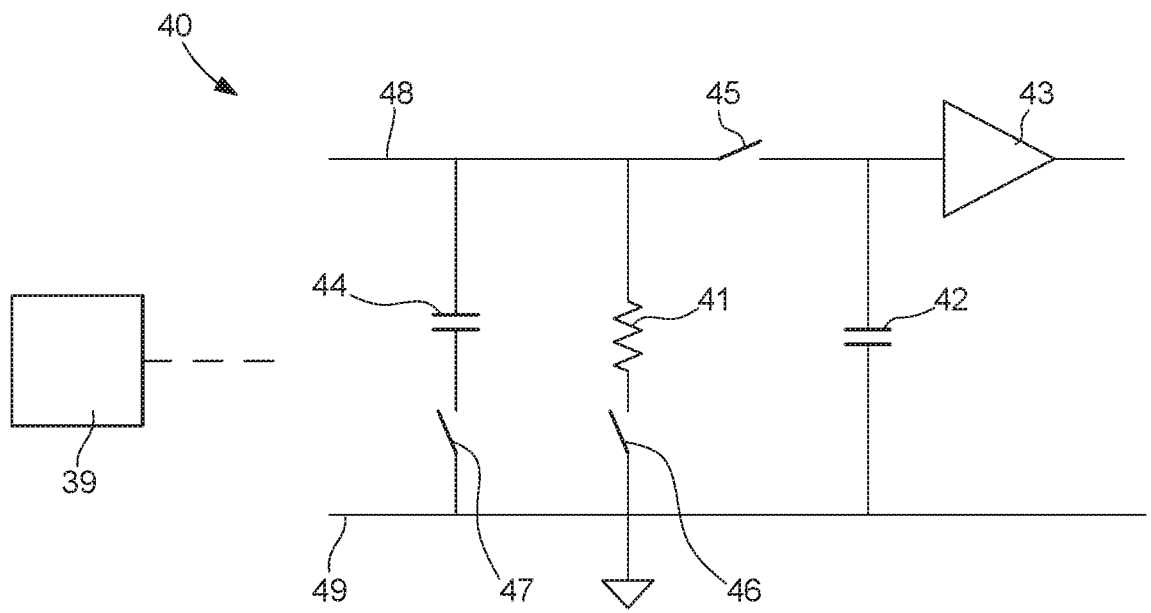
FIG. 4 shows a control system of a transmission device according to the invention.

As shown in FIG. 3, the electronic assembly 50 comprises an electrical element 4 and a radio frequency identification (RFID) type chip 1. The electrical element 4 is for example an energy storage battery allowing the chip to store energy provided by a signal received by the chip. Thus, the battery power allows the chip to perform tasks for a certain time after the signal reception stops. For example, the chip may have the function of re-emitting information following an activation triggered by the reception of the signal.

Figure 1:
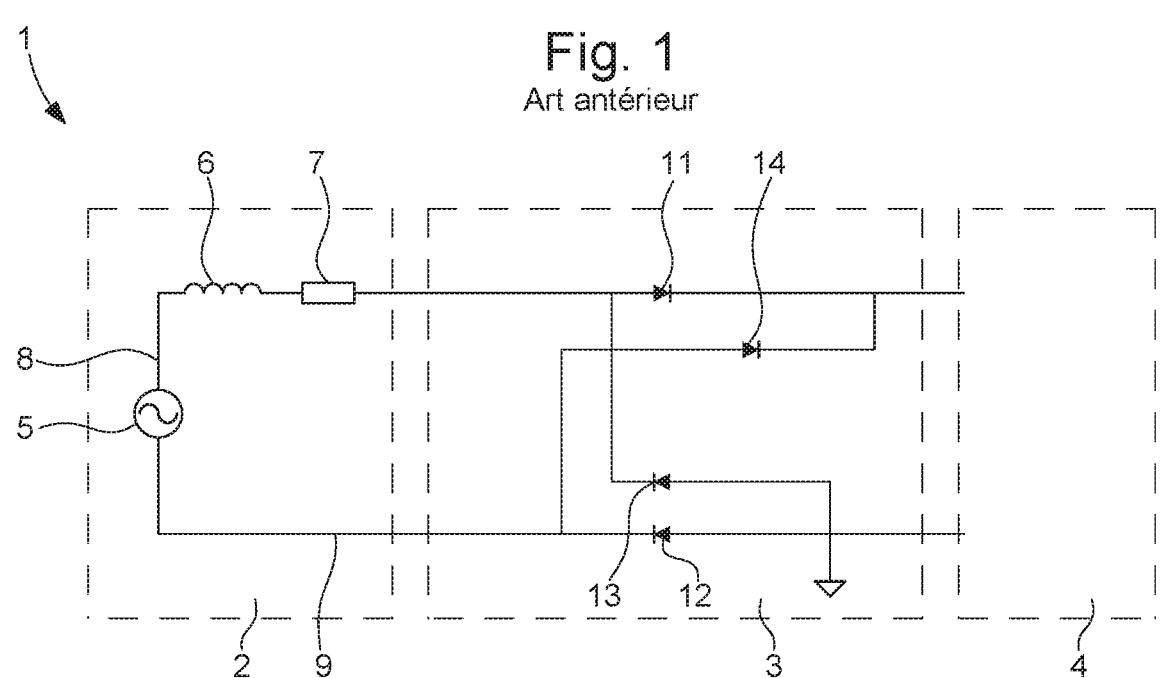
FIG. 1 shows a radio frequency identification chip connected to an electrical element according to an embodiment of the state of the art.

To this end, the chip 1 is provided with a receiving antenna 2 and with a voltage rectifier 3 of the signal received by the antenna. In FIG. 3, the antenna 2 is schematised by an alternating voltage generator 5 and an inductance 5, 6 (that is to say a coil and a resistance in series) on the branch of the phase 8. In the description, the terms "upstream" and "downstream" are defined relative to the generator, which is upstream of the elements of the circuit. The phase 8 branch of the generator 5 passes through the inductance 5, 6 to reach the input of the phase of the rectifier 3, while the neutral branch of the generator 5 is connected directly to the neutral input of the rectifier 3. The voltage rectifier 3 has the function of transforming the alternating signal received by the antenna 2 into a DC signal. The configuration of the rectifier 3 is identical to that described for that of the state of the art in FIG. 1.

To transmit the signal to the electrical element, the transmission device 20 comprises a voltage converter 30 connected on the one hand to the rectifier 3 of the chip 1, and on the other hand to the electrical element 4. The voltage converter 30 allows modifying the voltage of the DC signal to adapt it to the voltage of the electrical element 4. Thus, the converter 30 is configured to supply a predefined output voltage corresponding to that of the electrical element 4. The voltage 30 converter is further configured to receive as input the DC signal from the rectifier 3 on the branch of the phase 8. The phase input of the converter 30 is connected to the phase output of voltage rectifier 3. The converter also comprises a coil 31 mounted in series at the input of the phase branch to raise the signal voltage, as well as a condenser 32 connecting the phase to the neutral branch upstream of the coil 31.

According to the invention, the transmission device 20 comprises a control system 40 connected in parallel to the converter 30. The system 40 is connected to the phase of the converter 30 upstream of the coil 31 on the phase, and downstream of the condenser 32 on the neutral branch. The system 40 is configured to momentarily derive the signal in order to define an optimal input voltage of the converter 30 for which the input impedance of the converter 30 corresponds to the output impedance of the rectifier 3. For this purpose, the control system 40 comprises a reference resistance 41 arranged between the phase input 48 and the neutral branch 49. The resistance 41 is calibrated so that the voltage at its terminals corresponds to the optimal input voltage of the converter 30 for which the input impedance of the converter 30 is equal to the output impedance of the rectifier 3.

The control system 40 is configured to provide the converter 30 with an input voltage setpoint corresponding to the optimal voltage. To this end, as shown in FIG. 3, the control system 40 comprises a first condenser 42 connected in parallel and downstream of the reference resistance to momentarily store the reference voltage. Thus, the reference voltage is transmitted to the voltage converter 30 by the first condenser 42 while the signal is transmitted to the voltage converter 30. The output of the control system 40 is connected on the converter 30 to transmit the setpoint voltage to the converter 3.

The control system 40 also comprises a buffer amplifier 43 in series at the output of the phase. The buffer amplifier 43 allows electrically separating the converter 30 and the control system 40. The control system 40 further comprises a second condenser 44 connected in parallel with the reference resistance between the branch of the phase 48 and the neutral branch 49 upstream of the reference resistance 41. This second condenser 44 serves to stabilise the converter during the period when the signal is not derived by the control system 40, and is for example 4.7 µF.

According to the invention, the converter 30 is configured to adapt its input voltage to the optimal voltage defined at the terminals of the reference resistance 41. For this purpose, the converter 30 comprises an operational amplifier 33 connected at the input, on the one hand to the input of the converter 30 upstream of the coil 31 and downstream of the condenser 32, and on the other hand to the control system 40, through the buffer amplifier 43. The operational amplifier is configured to compare the input voltage of the converter 30 to the voltage setpoint defined by the control system 40. Thus, the operational amplifier transmits at the output an order depending on the voltage difference between the setpoint voltage and the input voltage. If there is no difference, the operational amplifier does not transmit an order to modify the input voltage of the converter 30.

The converter 30 further comprises a variable resistance 34 allowing to modify its input voltage. The variable resistance 34 is connected, on the one hand, to the output of the operational amplifier 33, and on the other hand, to the output of the phase of the converter 30. Thus, when the input voltage does not correspond to the setpoint voltage, the converter 30 modifies its variable resistance 34 until it reaches an input voltage corresponding to the setpoint voltage. The converter 30 also comprises a switch 35 at the output of the variable resistance to protect it when the signal is derived to the reference resistance 41.

To control the derivation of the signal and its redirection to the converter, the control system 40 comprises three switches 45, 46, 47, as well as means 39 for controlling the switches 45, 46, 47. The first switch 45 is disposed on the branch of the phase 48 between the first condenser 42 and the reference resistance 41. The second switch 46 is disposed between the reference resistance 41 and the neutral branch 49. The third switch 47 is disposed between the second condenser 44 and the neutral branch 49. The control means 39 are configured to close the first 45 and the second 46 switch and open the third switch 47 in order to derive the signal from the rectifier to the reference resistance 41. Thus, the signal no longer passes through the output of the converter 30, but is directed to the reference resistance 41 to determine the setpoint voltage. Furthermore, to redirect the signal to the converter, the control means 39 are configured to open the first 45 and the second 46 switch and close the third switch 47. In this case, the signal no longer reaches the terminals of the resistance 41, but is directed to the output of the converter 30.

Figure 5:
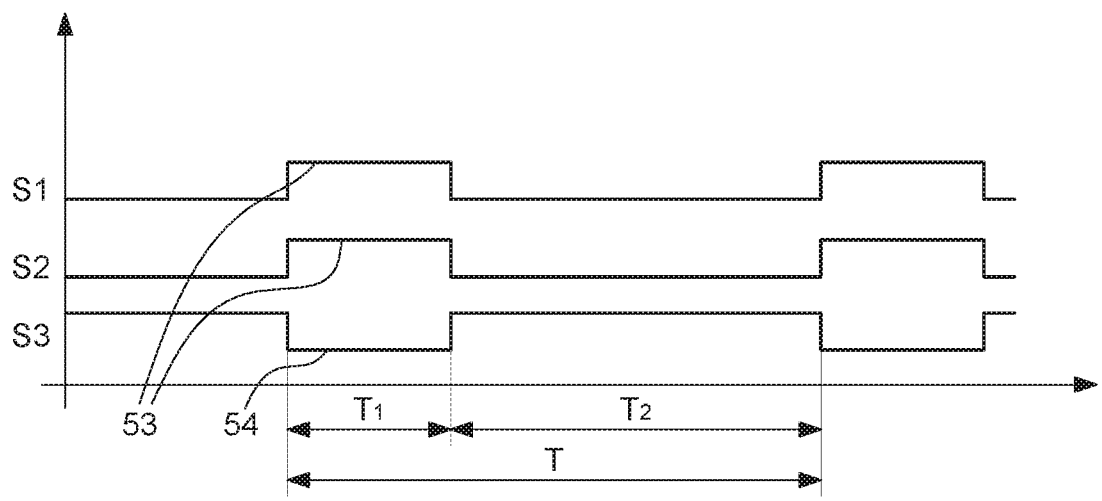
FIG. 5 shows a graph of operation of the transmission method according to the invention.

The control means 39 are preferably configured to alternately actuate the switches 45, 46, 47 at a predetermined frequency according to the method described above. FIG. 5 shows a graph representing the activation of the switches 45, 46, 47 over time, each switch being represented by a slot function S1, S2, S3, superimposed on each other. When a switch 45, 46, 47 is closed to transmit the current, the slot is high 53, and when a switch 45, 46, 47 is open to prevent the passage of the current, the slot is low 54. Thus, on the three superimposed functions, it is noted that the third switch S3 is in phase opposition relative to the first two switches. According to the method described above, the first two switches 45, 46 are closed, and the third 47 is opened to determine the reference voltage during time T1, then the first two switches 45, 46 are opened and the third 47 is closed during time T2, to transmit the maximum power to the electrical element 4. The time T1 is shorter than the time of T2, because the determination is made quickly, and a too long time during which the electronic element does not receive energy is thus avoided. The period T=T1+T2 is the entire method cycle.

In the example of FIG. 3, the electronic assembly 50 comprises a first protection unit 51 between the antenna 2 and the rectifier 3, and a second protection unit 52 between the rectifier 3 and the converter 30 to avoid electrostatic shocks.

In a particular embodiment, not shown in the figures, the electronic assembly also includes a starting device arranged between the rectifier and the electrical element. This device allows transmitting energy of the signal at very low voltage, particularly at the beginning of the reception of the signal by the antenna. When the starting device is used, the signal is transmitted directly to the electrical element without passing through the control system or the voltage converter. For example, a switch is used to transmit the signal to the starting device.

The detailed description shows a particular application to an RFID type chip, but the scope of the application is in no way limited to this example. Indeed, the method and the system according to the invention are applicable to other radio frequency receivers, for example receivers of the type WIFI, Bluetooth, etc.

The invention claimed is:

1. A method for transmitting, to an electrical element, power of a radio frequency (RF) signal received by an RF receiver, the RF receiver comprising a receiving antenna and a voltage rectifier, the method being performed by a transmission device comprising a control system and a voltage converter, the method comprising:
    deriving a direct current (DC) signal from the rectifier to the control system to define an optimal input voltage of the converter for which an input impedance of the converter corresponds to an output impedance of the rectifier,
    redirecting the DC signal from the control system to the voltage converter and simultaneously providing the converter with an input voltage setpoint corresponding to the optimal input voltage to permit maximum power to be transmitted to the converter,
    converting a signal voltage by the voltage converter, an output voltage of the converter being predefined depending on the electrical element, and
    transmitting the DC signal, converted by the converter, to the electrical element, wherein the control system comprises:
- a reference resistance, voltage at terminals of which defines the optimal input voltage, and
- a first condenser connected in parallel with and downsteam of the reference resistance to store the optimal input voltage.

2. The method according to claim 1, wherein the optimal input voltage is obtained by connecting the DC signal from the rectifier to the reference resistance.

3. The method according to claim 1, wherein the deriving, the redirecting and the simultaneously providing, the converting, and the transmitting are periodically repeated in order to adapt the input impedance of the converter to transmit maximum energy of the DC signal.

4. The method according to claim 1, wherein the deriving is performed for a first period and the redirecting and the simultaneously providing, the converting, and the transmitting are performed for a second period.

5. The method according to claim 1, further comprising:
comparing an input voltage of the converter to the input voltage setpoint defined by the system for controlling and modifying a variable resistance of the converter to modify the input voltage of the converter according to the input voltage setpoint.

6. A device for transmitting, to an electrical element, power of a radio frequency (RF) signal received by an RF receiver, the RF receiver comprising a receiving antenna and a voltage rectifier of a signal received by the antenna, the device comprising a voltage converter connected to the voltage rectifier and to the electrical element, wherein the device comprises a control system configured to derive a direct current (DC) signal from the rectifier to the control system in order to define an optimal input voltage of the converter for which an input impedance of the converter corresponds to an output impedance of the rectifier, and to redirect the DC signal from the control system to the voltage converter and simultaneously provide the converter with an input voltage setpoint corresponding to the optimal input voltage,
wherein the control system comprises:
- a reference resistance, voltage at terminals of which defines the optimal input voltage, and
- a first condenser connected in parallel with and downsteam of the reference resistance to store the optimal input voltage.

7. The device according to claim 6, wherein the control system comprises the reference resistance arranged between a phase input of the converter and a neutral branch.

8. The device according to claim 7, wherein the control system comprises a first switch between the first condenser and the reference resistance.

9. The device according to claim 8, wherein the control system comprises a second switch between the reference resistance and the neutral branch.

10. The device according to claim 9, wherein the control system comprises a second condenser in parallel and upstream of the reference resistance, and a third switch between the second condenser and the neutral branch.

11. The device according to claim 10, wherein the control system is configured to control the first switch, the second switch, and the third switch.

12. The device according claim 7, wherein the converter comprises an operational amplifier connected to an input of the voltage converter, and to the control system to compare an input voltage of the converter with the input voltage setpoint defined by the control system.

13. The device according to claim 12, wherein the converter comprises a variable resistance connected in series to an output of the operational amplifier.

14. An electronic assembly comprising an electrical element and a radio frequency (RF) receiver, the RF receiver being provided with a receiving antenna and a voltage rectifier of a signal received by the antenna, wherein the assembly comprises a transmission device comprising a voltage converter connected to the voltage rectifier and to the electrical element, wherein the device comprises a control system configured to derive a direct current (DC) signal from the rectifier to the control system in order to define an optimal input voltage of the converter for which an input impedance of the converter corresponds to an output impedance of the rectifier, and to redirect the DC signal from the control system to the voltage converter and simultaneously provide the converter with an input voltage setpoint corresponding to the optimal input voltage,
wherein the control system comprises:
- a reference resistance, voltage at terminals of which defines the optimal input voltage, and
- a first condenser connected in parallel with and down steam of the reference resistance to store the optimal input voltage.

* * * * *